United States Patent [19]
Sarraf

[11] Patent Number: 5,764,272
[45] Date of Patent: Jun. 9, 1998

[54] AUTOFOCUS MECHANISM FOR LASER IMAGER

[75] Inventor: Sanwal P. Sarraf, Pittsford, N.Y.

[73] Assignee: Eastman Kodak Company, Rochester, N.Y.

[21] Appl. No.: 634,598

[22] Filed: Apr. 24, 1996

[51] Int. Cl.⁶ ........................................... B41J 2/47
[52] U.S. Cl. ..................... 347/246; 347/257; 347/258
[58] Field of Search ...................... 347/252, 258, 347/248, 257, 256, 241, 246, 242, 244

[56] References Cited

U.S. PATENT DOCUMENTS

| | | |
|---|---|---|
| 4,698,691 | 10/1987 | Suzuki et al. |
| 4,724,505 | 2/1988 | Gelbort ............................... 361/167 |
| 4,772,582 | 9/1988 | DeBoer. |
| 4,823,330 | 4/1989 | Arter et al. ........................... 369/45 |
| 4,899,327 | 2/1990 | Bates et al. .......................... 369/45 |
| 4,951,273 | 8/1990 | Yoshida et al. ................... 369/44.11 |
| 5,144,615 | 9/1992 | Kobayashi ......................... 347/256 |
| 5,159,352 | 10/1992 | Ferla et al. ........................ 347/258 |
| 5,270,734 | 12/1993 | Ferschl .............................. 347/258 |

*Primary Examiner*—Mark J. Reinhart
*Attorney, Agent, or Firm*—Nelson Adrian Blish

[57] ABSTRACT

A laser imager autofocus apparatus, adapted to receive media with an image surface to be scanned, includes a laser and laser optics for producing a beam of light focused at an image plane. A photodiode is associated with the laser and adapted to produce a signal characteristic of the amount of light from the laser that is reflected from the image surface of received media onto the photodiode. Focus of the laser beam on the image surface is adjusted in response to the characteristic signal to maintain close association of image surface of received media and the image plane of the laser and laser optics. The focus adjusting means may move one or more of the laser, the laser optics, or the image surface of received media. The laser source may be an array of plural laser sources in a line, and the plural laser sources may tilt relative to the image surface of received media.

4 Claims, 3 Drawing Sheets

AUTOFOCUS MECHANISM FOR LASER IMAGER

BACKGROUND OF THE INVENTION

1. Technical Field

This invention relates generally to laser imaging such as writing and reading, and more particularly to an autofocus system for laser imagers.

2. Background Art

In typical laser-based digital imagers such as writing and reading systems, a laser or an array of lasers is focused at an image plane with a desired spot profile. An image surface (read or write surface) is positioned coincident with the image plane. The laser or lasers are scanned across the image surface to write or read images. The laser(s) can be used as heat or photon sources depending on the nature of the medium to be scanned.

In high-resolution imaging, the laser or laser array is generally tightly focused to produce a small spot at the image plane. Because of the smallness of the spot at the image plane, the spot profile increases very rapidly away from this plane, causing a rapid change in the energy density as well as spot size. Changes in energy density and/or spot size may cause severe artifacts in the image produced or errors in the read data.

Due to mechanical and/or electrical imperfections of the components of typical prior art laser imagers, as well as thickness variations in media to be scanned, the image surface will often physically depart from the image plane, causing image artifacts and read data errors.

DISCLOSURE OF THE INVENTION

It is an object of the present invention to provide a laser imager autofocus apparatus for maximizing the laser energy density at the image surface.

It is another object of the present invention to provide, for a given optical system, the minimum spot size at the image surface. That is, the write or read surface remains at or very close to the image plane of the system.

According to these and other objects, a mechanism and process is provided which signals any deviation of the image surface from the image plane during operation, and feeds back to the laser system, a signal to move the laser, laser optics, image surface, or any combination thereof to re-establish the imaging surface at the image plane so as to reduce any image artifacts and scanned data errors due to inconsistency of the exposure.

Lasers, and particularly semiconductor lasers, are very sensitive to reflection back to their cavity of emitted radiation. This perturbs the gain of the laser and causes fluctuation of laser power. The power of the laser varies directly with the amount of radiation reflected back to the laser. This phenomenon, called "feed-back noise," is generally known and understood in the art. This phenomenon has been used in semiconductor lasers by building a photodiode on the laser chip and monitoring the laser radiation with the photodiode.

I have discovered that, surprisingly, the image surface of scanned media acts as a dynamic back reflector for the laser such that the back reflection is maximum when the image surface of the scanned medium is positioned at the image plane of the laser optics. As the media's image surface moves in and out of the image plane, the back reflection to the laser cavity changes. This change is indicated by the signal obtained from the photodiode. According to the present invention, the signal is used to move appropriate components of the system to reestablish the image surface of the scanned media at the image plane. The successful completion of the operation is indicated by a null effect at the comparator.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
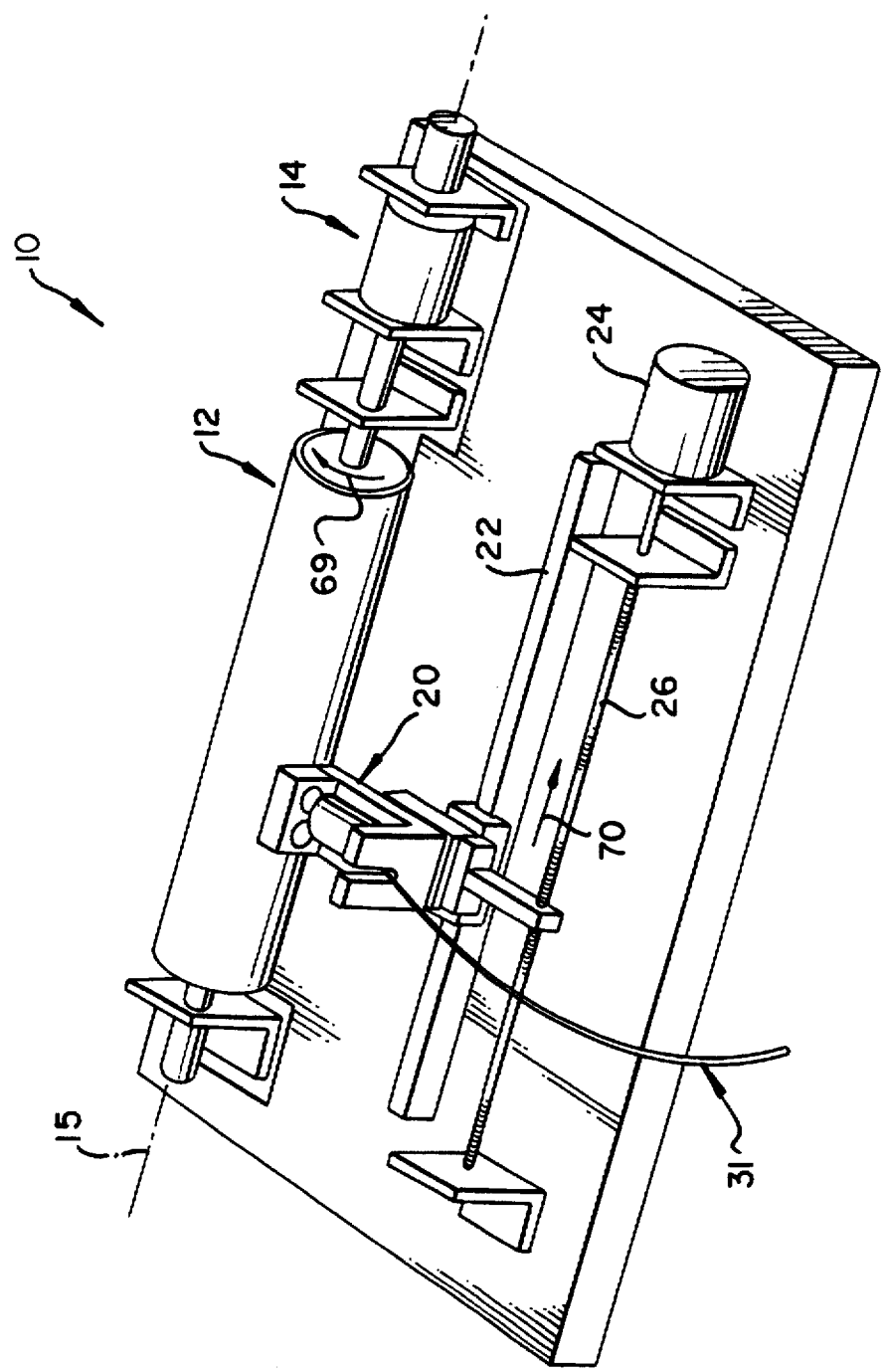
FIG. 1 shows an imager in which the present invention can be used.

Referring to FIG. 1, a laser printer imager 10 includes a drum 12 driven by a motor 14 for rotation about an axis 15. The drum is adapted to receive media, not shown, having an image surface to be scanned. For example, a thermal print media for use with printer imager 10 can be a media disclosed in commonly assigned U.S. Pat. No. 4,772,582, entitled "Spacer Bead Layer for Dye-Donor Element Used in Laser Induced Thermal Dye Transfer" granted Sep. 20, 1988.

A printhead 20 is movably supported adjacent drum 12 for slidable movement on a rail 22. The printhead is driven by a motor 24 and a lead screw 26. Printhead 20 includes a fiber optic array optically connected by optical fibers 31 to a plurality of diode lasers 36 (FIG. 2), which can be individually modulated according to an information signal in a well known manner to selectively direct light from the optical fibers onto received media.

In use of printer imager 10, drum 12 would be driven in the direction of arrow 69 by motor 14. Each of the fibers in printhead 20 would be separately modulated in accordance with the information signal to produce a series of minipixels. During the printing process, printhead 20 can be advanced continuously in the direction of arrow 70 so that helical scan lines (not shown) are traced on the received media supported on drum 12. One method of controlling the minipixels to achieve different gray levels is disclosed in U.S. Pat. No. 4,698,691.

Figure 2:
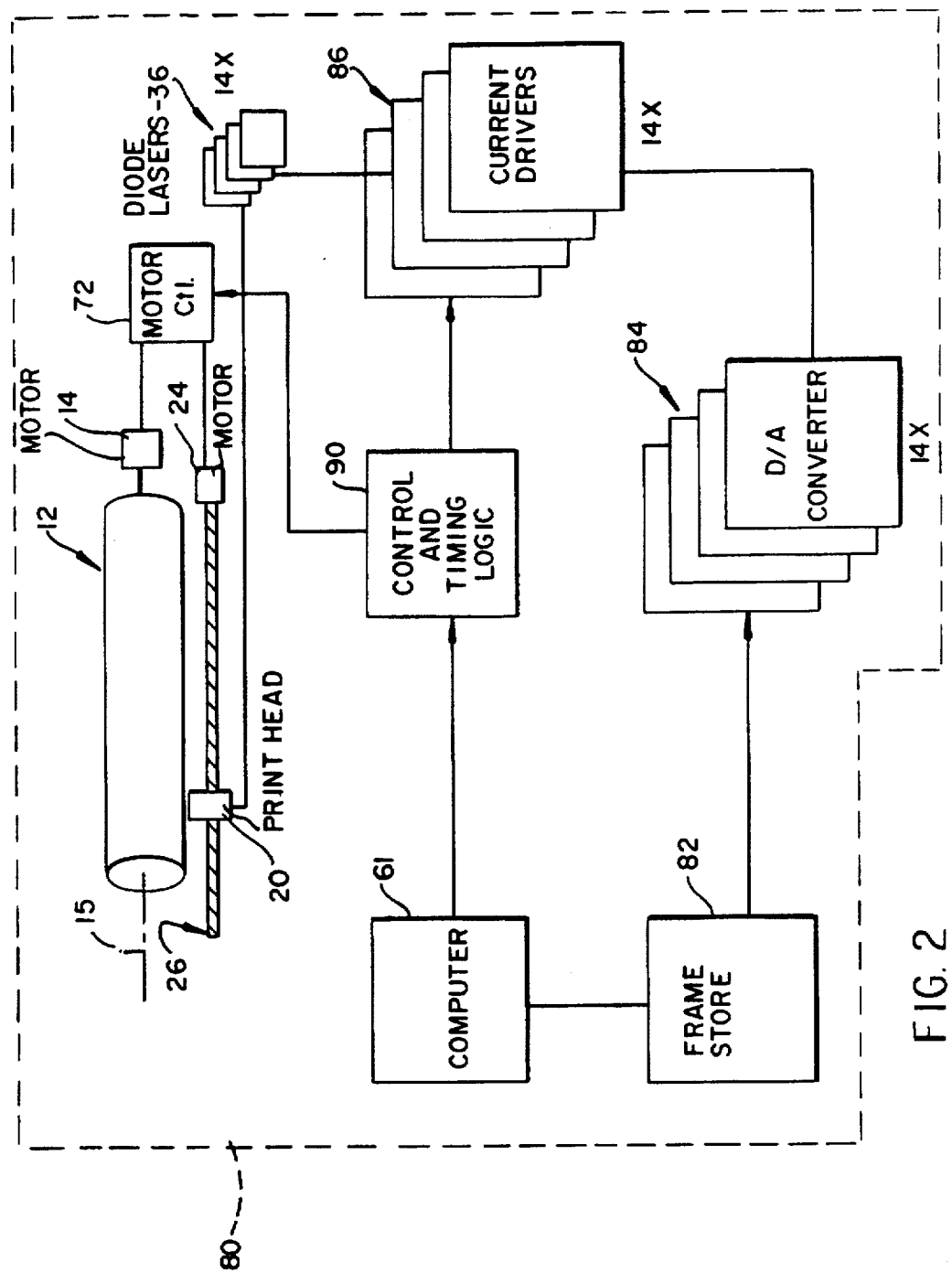
FIG. 2 shows a control system for the imager of FIG. 1.

A control system 80 for printer imager 10 is shown in FIG. 2. Control system 80 includes a frame store 82 for delivery of data to digital-to-analog (D/A) converters 84 and current drivers 86 for diode lasers 36. A microcomputer 61 provides overall control of printer imager 10 and interfaces with control and timing logic 90 which is coupled to a motor control 72 for regulating the speeds of motor 14 and motor 24 and for controlling the focus and tilt of the printhead. Control and timing logic 90 also provides signals to current drivers 86 to modulate diode lasers 36 in timed relation with the movement of drum 12 and printhead 20.

Figure 3:
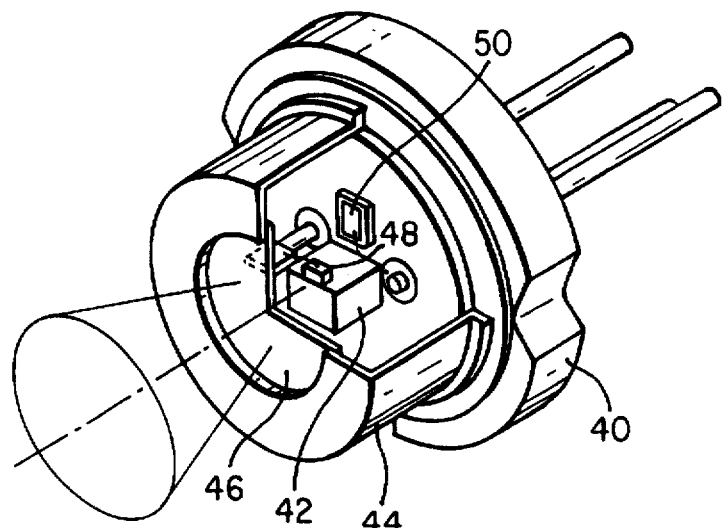
FIG. 3 shows a commercially available laser diode which may be used in accordance with the present invention.

FIG. 3 shows a commercially-available single-beam type laser diode including a stem 40, a heat sink 42, a cap 44, a glass window 46, a laser chip 48, and a PIN photodiode 50. Conventionally, the photodiode is provided to monitor the amount of radiation emitted by the laser.

According to the present invention, the image surface of received media acts as a dynamic back reflector for the laser. The back reflection is maximum when the image surface is at the image plane of the laser system. The back reflection is detected by photodiode 50. As the image surface of the received media moves in and out of the image plane of the laser system, the back reflection to the laser cavity changes, as indicated by the output signal of the photodiode.

According to the present invention, the laser itself is used as the monitor for the image surface position, so no external detection scheme is required to monitor media position; thus reducing costs. The photodiode built in the laser provides insitu active operation without any phase lag; thus making for a more accurate servo correction. The system is very compact, because no additional monitoring devices are required near the image plane.

Figure 4:
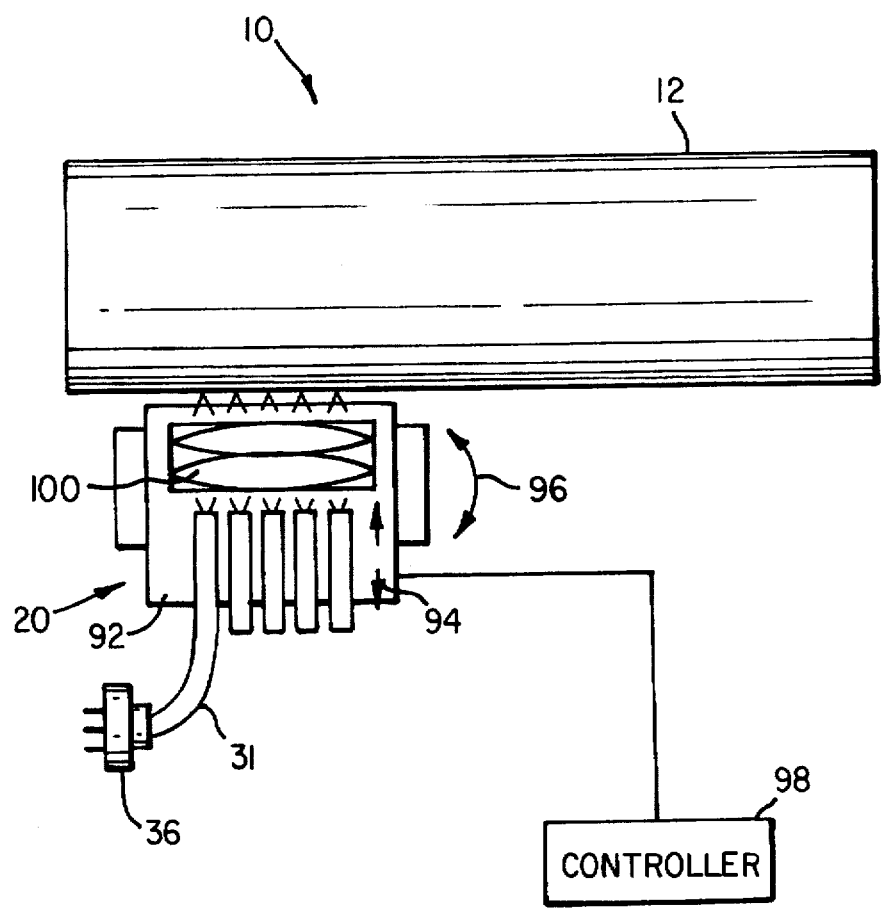
FIG. 4 is a schematic illustration of the autofocus mechanism according to the present invention.

Referring to FIG. 4, laser printer imager 10 is schematically shown. Printhead 20 is positioned adjacent to drum 12, and has a plurality of diode lasers 36, one of which is illustrated. An optical fiber 31 is shown connected to the one illustrated diode laser, and the ends of several other optical fibers are shown. The other, non-illustrated ends of these optical fibers will, of course, be connected to respective diode lasers.

The ends of optical fibers 31 are held in a block 92 which is mounted for lateral movement across drum 12 as explained above. Block 92 is also mounted for movement toward and away from the drum, as illustrated by arrow 94, and for rotational movement as indicated by arrow 96 by a controller 98 to focus the individual fiber end, through optics 100 onto the drum in accordance with the output of a plurality of photodiodes.

The invention has been described in detail with particular reference to preferred embodiments thereof, but it will be understood that variations and modifications can be effected within the spirit and scope of the invention.

What is claimed is:

1. A laser imager autofocus apparatus adapted to receive media with an image surface to be scanned, said apparatus comprising:

a laser and laser optics for producing a beam of light focused at an image plane;

a photodiode adjacent said laser and approximately parallel to an optical axis of said laser and adapted to produce a signal characteristic of the amount of light from the laser that is reflected from the image surface of received media onto the photodiode;

means for adjusting focus of the beam on the image surface; and means, responsive to the characteristic signal, for controlling the focus adjusting means to maintain close association of the image surface of received media and the image plane of the laser and laser optics.

2. A laser imager autofocus apparatus as set forth in claim 1 wherein said focus adjusting means comprises means for moving one or more of the laser, the laser optics, or the image surface of received media.

3. A laser imager autofocus apparatus as set forth in claim 1 wherein said laser comprises an array of plural laser sources.

4. A laser imager autofocus apparatus as set forth in claim 3 wherein said array of plural laser sources comprises a plural laser in a line, and further comprising means, responsive to the characteristic signal, for adjusting the position of the plural laser sources to tilt the line of lasers relative to the image surface of received media.

* * * * *

UNITED STATES PATENT AND TRADEMARK OFFICE
CERTIFICATE OF CORRECTION

PATENT NO. : 5,764,272

DATED : July 9, 1998

INVENTOR(S) : Sanwal P. Sarraf

It is certified that error appears in the above-identified patent and that said Letters Patent is hereby corrected as shown below:

Title page, insert the following item:
--[60] Provisional application No. 60/003,638 Sept. 12, 1995--.

Column 1, line 3, insert the following
--CROSS REFERENCE TO RELATED APPLICATION
Reference is made to and priority claimed from U.S. provisional application Ser. No. 60/003,638, filed Sept. 12, 1995, entitled AUTOFOCUS MECHANISM FOR.--

Signed and Sealed this

First Day of December, 1998

Attest:

BRUCE LEHMAN

*Attesting Officer*　　　*Commissioner of Patents and Trademarks*